H. A. MOODY.
GATE VALVE.
APPLICATION FILED NOV. 7, 1918.
1,328,752.
Patented Jan. 20, 1920.
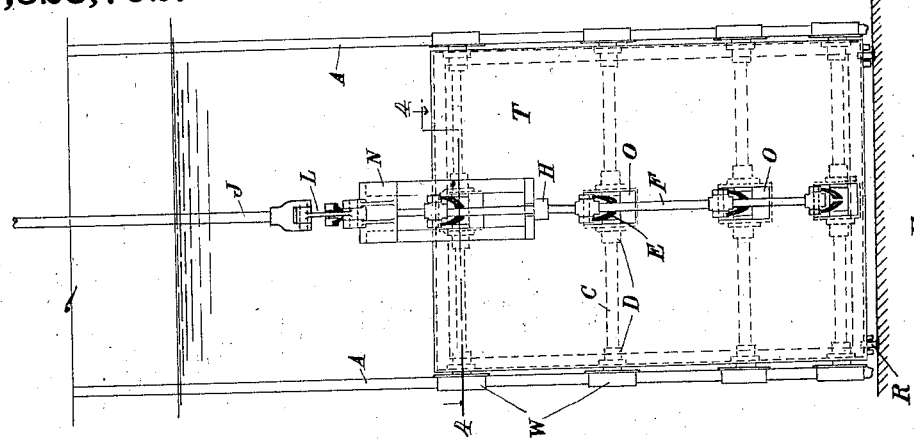
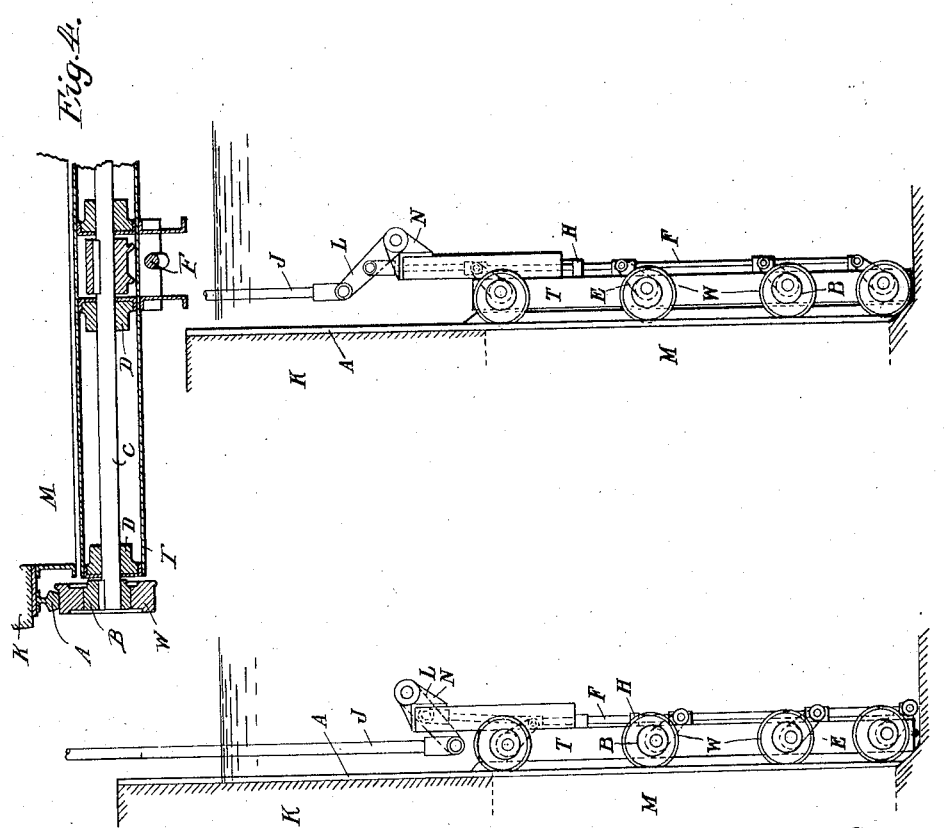
Inventor
Herbert A. Moody
By Geo. E. Tew
Attorney

UNITED STATES PATENT OFFICE.

HERBERT A. MOODY, OF TURNERS FALLS, MASSACHUSETTS.

GATE-VALVE.

1,328,752.  Specification of Letters Patent.  Patented Jan. 20, 1920.

Application filed November 7, 1918. Serial No. 261,482.

*To all whom it may concern:*

Be it known that I, HERBERT A. MOODY, a citizen of the United States, residing at Turners Falls, in the county of Franklin and State of Massachusetts, have invented certain new and useful Improvements in Gate-Valves, of which the following is a specification.

This invention relates to hydraulic gate valves, particularly useful in controlling the flow of water in penstocks leading to water wheels in power installations. Such valves open and close under heavy pressure, and the object of the present invention is to provide means for avoiding friction between the gate and its seat, so as to decrease the power required to operate the valve. Also, the valve has a movement perpendicular to its seat, so that the faces of the gate and its seat may be tongued and grooved, or made of some compressible material, to insure tightness, either of which would not be possible where sliding friction exists. The invention therefore provides means for initially moving the valve from its seat, before lifting.

The objects above indicated are effected by providing the valve with rollers which are mounted on eccentric bearings which can be turned to shift the valve toward or from its seat. Other improved details will be apparent from the disclosure.

In the accompanying drawings, Figure 1 is a front elevation of the valve. Figs. 2 and 3 are side elevations showing the valve in two different positions. Fig. 4 is a section on the line 4″—4″ of Fig. 1.

The valve body is of the gate type and is indicated at "T", and it is arranged to move on the pressure side of a head "K" to open or close the mouth "M" of the penstock. Obviously, it may be used in a pipe or other local conditions. The valve is mounted on flanged wheels "W" which roll on a track "A" on the face of the head. Four pairs of wheels are shown but this number may be varied. The wheels turn on eccentrics "B" which are keyed to shafts "C" which extend across within the gate body and turn in bearings "D" fixed to the valve. At the middle of each shaft is a lever arm "E" pivotally connected to a stem "F". The arms work through openings "O" in the back plate of the valve. The stem "F" is connected at its upper end to a lever "L" which is fulcrumed on a bracket "N" on the top of the valve and connected to a rod "J" to which the lifting power will be applied in any suitable way. The stop "H", on the stem "F", limits the movement of the stem and consequently the throw of the eccentrics. After this stop acts, all the lifting forces act to raise the valve. At the bottom the valve has small rollers "R" which travel on the floor of the penstock, to facilitate the movement of the gate from its seat. In operation, to open the valve, lift on the rod "J" first operates the stem "F" and turns the eccentrics "B" which act through the rollers to force the valve laterally away from its seat, as indicated in Fig. 3, after which the gate lifts, the rollers traveling on the tracks. In closing, the reverse action occurs, the gate first being lowered to position opposite its seat, then the eccentrics turned to allow it to close. The lever "L" may be omitted, and the rod "J" connected directly to the stem "F", but the use of the lever insures that the eccentrics shall turn and throw the gate away from its seat before it begins to lift, so as to avoid any possible sliding friction between the gate and its seat. The invention is not limited to the exact structure shown, but the principle of first shifting the gate from its seat, before it begins to lift may be embodied in various other constructions, within the scope of the invention.

I claim:

1. The combination with a sliding gate valve carrying wheels at the sides thereof, on which it travels, of means to shift the valve laterally with respect to the wheels, to vary the position of the valve with respect to its seat.

2. The combination with a sliding gate valve having wheels at the sides thereof, on which it travels, of eccentrics carried by the valve and forming bearings for the wheels, and means to turn said eccentrics to shift the valve toward or from its seat.

3. The combination with a sliding gate valve, of a shaft extending across the valve and having eccentrics at the ends thereof, wheels mounted on said eccentrics, an arm projecting from the shaft, and a lifting stem connected to said arm and adapted to turn the shaft and also lift the valve.

4. The combination with a sliding gate valve, of a shaft extending across the valve and having eccentrics at the ends thereof, wheels mounted on said eccentrics, an arm projecting from the shaft, and a lifting stem connected to said arm and a stop to limit the turn of said shaft.

In testimony whereof, I affix my signature in presence of two witnesses.

HERBERT A. MOODY.

Witnesses:
ARTHUR G. GIBSON,
A. J. POTTER.